United States Patent [19]

Morinaga et al.

[11] Patent Number: 4,562,497
[45] Date of Patent: Dec. 31, 1985

[54] TAPE DRIVE SPINDLE

[75] Inventors: Kaoru Morinaga, Yokohama; Hiroshi Kawakami, Fujisawa; Yoshihiro Kotoda, Yokohama, all of Japan

[73] Assignee: Tokyo Shibaura Denki Kabushiki Kaisha, Kanagawa, Japan

[21] Appl. No.: 493,634

[22] Filed: May 11, 1983

[30] Foreign Application Priority Data

May 12, 1982 [JP] Japan ................................ 57-79430

[51] Int. Cl.⁴ .......................................... G11B 15/00
[52] U.S. Cl. ................................ 360/96.3; 360/965; 242/199
[58] Field of Search ............. 360/96.3, 96.5, 93, 360/133, 71; 242/198, 72, 68.1, 68.2

[56] References Cited

U.S. PATENT DOCUMENTS

| | | | |
|---|---|---|---|
| 3,934,839 | 1/1976 | Serizawa | 242/198 |
| 4,054,930 | 10/1977 | Terada | 360/96.5 |
| 4,383,282 | 5/1982 | Osanai | 360/96.3 |

*Primary Examiner*—John H. Wolff
*Attorney, Agent, or Firm*—Finnegan, Henderson, Farabow, Garrett & Dunner

[57] ABSTRACT

A tape drive spindle for driving a reel hub rotatably mounted within a tape housing of a cartridge type tape. The tape drive spindle is provided with a base member, a spindle shaft member and a resilient joint member interposed between the base member and the spindle shaft member. The base member is adapted for rotation about an axis thereof by a driving source. The spindle shaft member is concentric with the base member and adapted to engage with the reel hub. The resilient joint member couples the spindle shaft member to the base member.

9 Claims, 3 Drawing Figures

TAPE DRIVE SPINDLE

FIELD OF THE INVENTION

This invention relates to a tape drive spindle, and more particularly to a tape drive spindle for a tape player using cartridge type tapes which drives a reel hub rotatably mounted within the tape housing of the cartridge.

In a tape player which uses cartridge type tapes, for example, conventional cassette tapes, a tape drive spindle is used for driving a reel hub rotatably mounted within the tape housing of the cassette to take up magnetic tape about the reel hub. The tape drive spindle includes a base portion adapted to be driven by a driving source within the tape player and a spindle shaft portion adapted for engaging and driving the reel hub.

In conventional tape drive spindles, the base portion and the spindle shaft portion are made in one body or at least are connected to each other directly. Tape players equipped with the conventional tape drive spindles, however, have the drawback that wow and flutter characteristics are poor. The conventional tape drive spindle transmits mechanical vibrations arising in the driving source to the magnetic tape. When a tape vibrates while moving across a recording and or reproducing head, the vibration of the tape adversely affects the recording or reproducing of the magnetic tape by the head. Some vibration arising in the driving source is due to the electric motor or gearing within the driving source. The vibration of the driving source is transmitted to the reel hub through the tape drive spindle. The vibration of the reel hub is then transmitted to the tape portion during operation. Other sympathetic vibration also can arise in the tape itself caused by the vibration from the driving source. The vibration of the driving source in the conventional tape player thus disturbs directly or indirectly the recording or reproducing of the magnetic tape when the vibration has been transmitted through the tape drive spindle.

Further, the spindle shaft portion of the tape drive spindle sometimes does not properly engage with the reel hub of the cartridge type tape during the loading operation of the cartridge type tape onto the tape player. When teeth formed on the inner surface of the reel hub improperly mate with blades formed on the outer surface of the spindle shaft portion of the tape drive spindle —i.e. edge to edge in their longitudinal directions —the loading of the cassette tape is prevented or the reel hub and the tape drive device are damaged.

SUMMARY OF THE INVENTION

It is, therefore, an object of the invention to provide a tape drive spindle which reduces vibrations originating from the driving source to the reel hub of a tape cartridge.

Another object of the invention is to provide a tape drive spindle with improved operability.

According to one aspect of the present invention, the tape drive spindle for rotating a reel hub rotatably mounted within the tape housing of a tape cartridge includes a base member adapted for rotation about an axis when driven by a driving source, a spindle shaft member concentric with the axis of the base member and adapted to engage with the reel hub, and a resilient joint member interposed between and coupling the spindle shaft member to the base member. Additional objects and advantages of the present invention will become apparent to persons skilled in the art from the following detailed description and the accompanying drawings.

DESCRIPTION OF THE PREFERRED EMBODIMENT

The present invention will be described in detail with the accompanying drawings. Throughout the drawings, like reference letters and numerals will be used to designate like or equivalent elements.

Figures 1, 2:
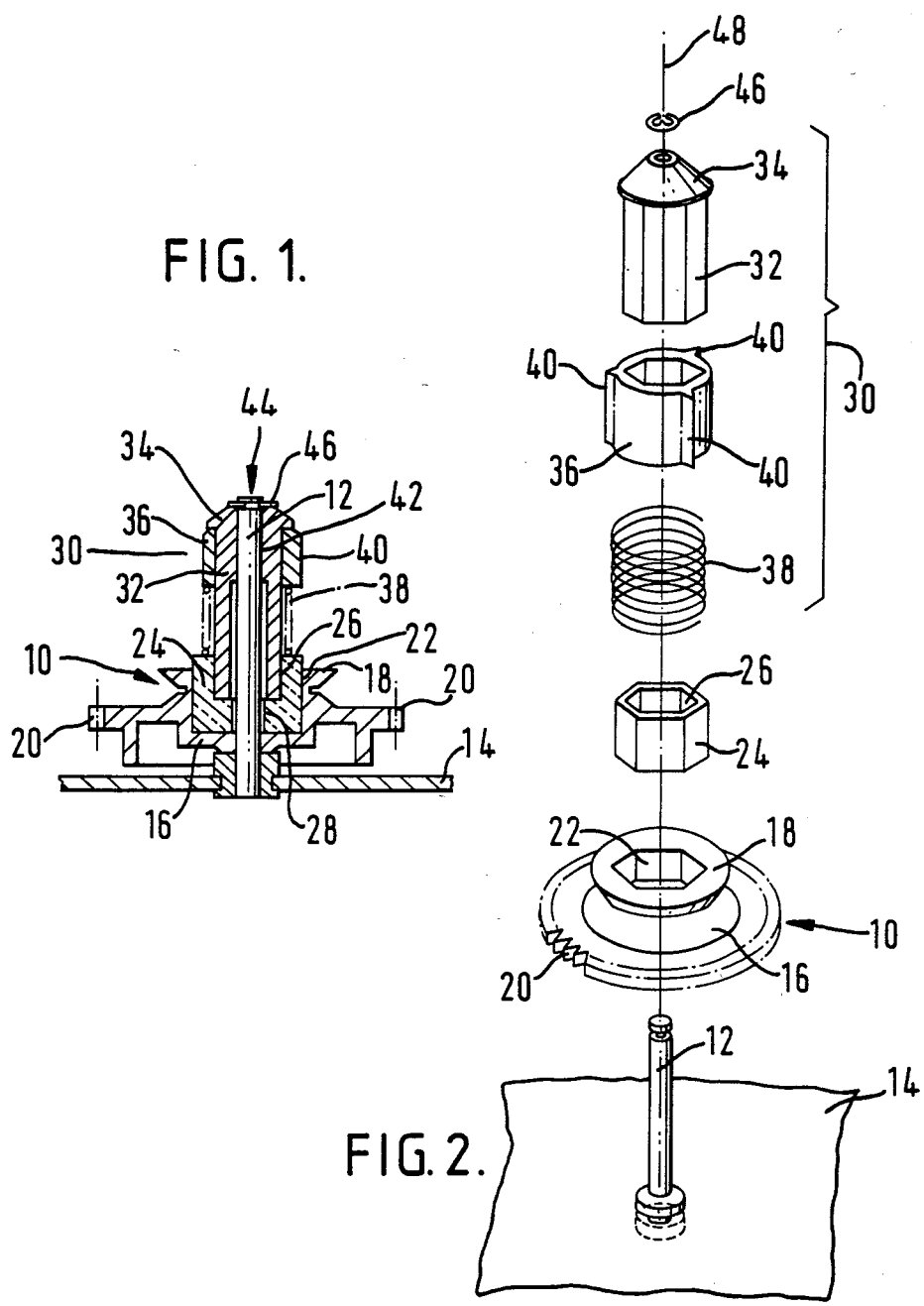
FIG. 1 is a sectional side view showing a tape drive spindle incorporating the present invention.
FIG. 2 is an exploded view showing the tape drive spindle of FIG. 1.

FIGS. 1 and 2, respectively, are a sectional side view and an exploded view of tape drive spindle 44 using the present invention. Base member 10 has a round shape and is rotatably mounted on post 12 protruding from chassis 14 of a tape player (not shown). Base member 10 includes bearing surface 16 and retainer portion 18 located at the respective ends of member 10. Bearing surface 16 is mounted on post 12 and adapted to be rotatably driven by a driving source (not shown) mounted within the tape player. Bearing surface 16 is driven by engagement of its peripheral gear section 20 with the driving source or by engagement of a conventional friction gear (not shown). Retainer portion 18 includes a recess 22 with a hexagonal shape (or other appropriate angled shape). Retainer portion 18 of base member 10 receives in its recess 22 resilient joint member 24 preferably made of rubber or other resilient material.

Resilient joint member 24 is formed in a pillar type shape with a hexagonal outer surface. Resilient joint member 24 is mounted in retainer portion 18 of base member 10 with a first end fitting in hexagonal recess 22 of retainer portion 18 of base member 10. Resilient joint member 24 has an inner hexagonal recess 26 at its second end and a through opening 28, both the recess and opening being concentric with the vertical axis 48 of tape drive spindle 44. Post 12 freely penetrates through opening 28 of resilient joint member 24 mounted on retainer portion 18 of base member 10.

Resilient joint member 24 receives shaft member 30 in its recess 26. Spindle shaft member 30 includes shaft portion 32 having flange portion 34 at its upper end. Shaft portion 32 is formed in a pillar type shape with a hexagonal outer surface and is mounted with its hexagonal outer surface fitting into recess 26 of resilient joint member 24. Spindle shaft member 30 further includes sleeve 36 and coil spring 38. Sleeve 36 has a hexagonal inner surface and an approximately round outer surface with three equally distanced blades 40 projecting from the surface and lying parallel to the axis 48 of tape drive spindle 44. Sleeve 36 is slideably mounted on shaft portion 32. Sleeve 36 does not rotate relative to shaft portion 32 due to the mating of the hexagonal surfaces of shaft portion 32 and sleeve 36. Sleeve 36 is biased against flange portion 34 by coil spring 38 mounted between sleeve 36 and resilient joint member 24. The blades 40 on the outer surface of sleeve 36 are adapted for engagement with teeth of a reel hub rotatably mounted within a tape housing of a conventional cartridge type tape. An opening 42 through shaft portion 32 receives post 12.

Tape drive spindle 44, comprising base member 10, resilient joint member 24 and spindle shaft member 30, is rotatably mounted on post 12 of the tape player and held in place by E-ring 46 fastened in a receiving channel at the top of post 12.

During operation of tape drive spindle 44, base member 10 is driven by the driving source through engagement of gear section 20 or the friction gear with the driving source. Mechanical vibrations arising in the driving source will be transmitted to base portion 10 from the driving source. The mechanical vibrations are, however, easily absorbed or eliminated by resilient joint member 24 before its transmission into spindle shaft member 30. Therefore, mechanical vibrations originating from the driving source are not transmitted to the tape during operation.

Figure 3:
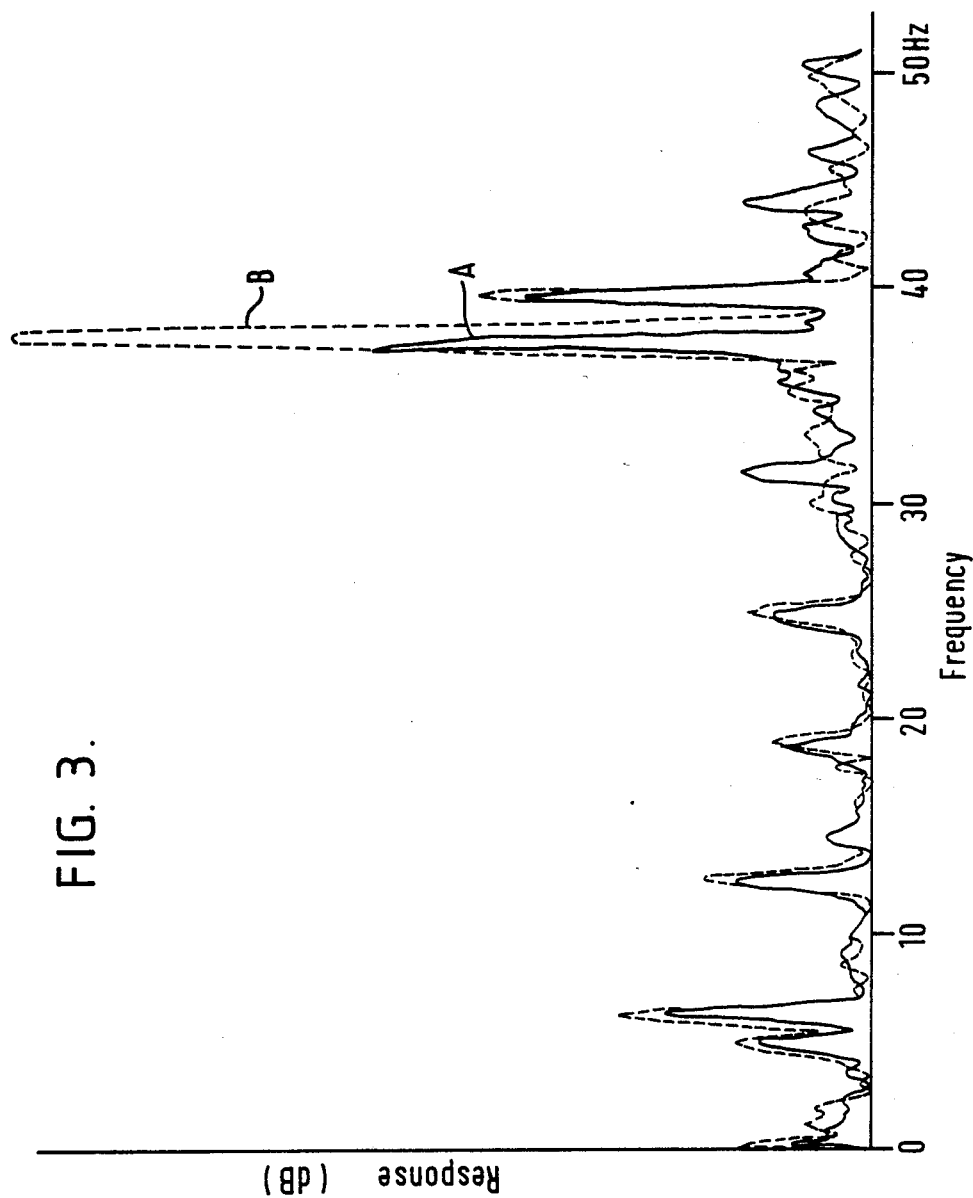
FIG. 3 is a graph showing the wow and flutter characteristics of a tape player equipped with the present invention and one not so equipped.

FIG. 3 is a graph showing the wow and flutter characteristics of a tape player both when tape drive spindle 44 according to the present invention is used or when a conventional tape drive spindle is used. The solid curve A represents the wow and flutter characteristic in the tape player equipped with a tape drive spindle such as shown in FIGS. 1 and 2. The dotted curve B represents the wow and flutter characteristic of a tape player equipped with a conventional tape drive spindle which is made in one body but is approximately the same size as tape drive spindle 44 of FIGS. 1 and 2 and has similar dimensions. The tape drive spindle according to the present invention contributes to improve the wow characteristic at a lower frequency around 5 Hz and the flutter characteristic at a higher frequency around 40 Hz.

Further, tape drive spindle 44 of FIGS. 1 and 2 is easily brought into engagement with the reel hub. This is, when the teeth of the reel hub improperly engage with blades 40 of sleeve 36 of spindle shaft member 30, sleeve 36 is not only able to slide along shaft portion 32 but also is able to rotate about post 12 together with shaft portion 32. Resilient joint member 24 is deformed so as to allow the rotations of sleeve 36 and shaft portion 32 in spite of base member 10 being fixed.

What is claimed is:

1. A tape drive spindle for rotating a reel hub rotatably mounted within a cartridge tape housing, comprising;
   a base member adapted for rotation about an axis thereof by a driving source;
   a spindle shaft member coaxial with said base member and adapted to engage with said reel hub; and
   a resilient joint member interposed between said spindle shaft member and said base member and resiliently coupling in torsion said spindle shaft member to said base member.

2. The tape drive spindle according to claim 1, wherein said resilient joint member has a first joint portion at one end and a second joint portion at a second end, said first joint portion being coupled to said base member and said second joint portion being coupled to said spindle shaft member.

3. The tape drive spindle according to claim 2, wherein said resilient joint member is made of rubber.

4. The tape drive spindle according to claim 1, wherein said resilient joint member is made of rubber.

5. A tape drive spindle for rotating a reel hub rotatably mounted within a cartridge tape housing, comprising:
   a base member rotatably drivable about an axis by a driving source, said base member including a first polygonally shaped socket centered on said axis;
   a resilient joint member including a first joint portion at one end and a second joint portion at the other end, said first joint portion having a polygonally shaped outer surface fitting within and cooperating with said first polygonally shaped socket of said base member, and said second joint portion including a second polygonally shaped socket; and
   a spindle shaft member coaxial with said base member and engageable with said reel hub, said spindle shaft member including a polygonally shaped shaft portion having one end fitting within and cooperating with said second polygonally shaped socket of said resilient joint member.

6. The tape drive spindle according to claim 5, wherein said resilient joint member is made of rubber.

7. The tape drive spindle according to claim 5, wherein said first and second sockets, said first joint portion of said resilient joint member, and said shaft portion of said spindle shaft member are hexagonal in shape.

8. The tape drive spindle according to claim 5, wherein said spindle shaft member further includes a flange portion at the end of said spindle shaft member opposite said one end fitting within said second socket, a bladed sleeve portion engageable with said reel hub, said bladed sleeve portion having a polygonally shaped bore for cooperating with said shaft portion and being axially slidable on said shaft portion, and spring means for biasing said bladed sleeve portion toward said flange portion.

9. A tape drive spindle for rotating a reel hub rotatably mounted within a cartridge tape housing, comprising:
   a base member having a first end including a gear section rotatably drivable about an axis by a driving source and a second end including a first hexagonally shaped socket centered on said axis;
   a resilient joint member including a first joint portion at one end and a second joint portion at the other end, said first joint portion having a hexagonally shaped outer surface fitting within and cooperating with said first hexagonally shaped socket of said base member, and said second joint portion including a second hexagonally shaped socket; and
   a spindle shaft member coaxial with said base member, said spindle shaft member including a hexagonally shaped shaft portion having one end fitting within and cooperating with said second hexagonally shaped socket of said resilient joint member, a flange portion at the other end of said shaft portion, a bladed sleeve portion engageable with said reel hub, said bladed sleeve portion having a hexagonally shaped bore for cooperating with said shaft portion and being axially slideable on said shaft portion, and spring means for biasing said bladed sleeve portion toward said flange portion.

* * * * *